US010600082B1

(12) United States Patent
Gotcher et al.

(10) Patent No.: US 10,600,082 B1
(45) Date of Patent: Mar. 24, 2020

(54) ADVERTISING SELECTION

(75) Inventors: Peter C. Gotcher, Hillsborough, CA (US); Eric M. Gottschalk, Carlsbad, CA (US)

(73) Assignee: BEATS MUSIC, LLC, San Francisco, CA (US)

( * ) Notice: Subject to any disclaimer, the term of this patent is extended or adjusted under 35 U.S.C. 154(b) by 383 days.

(21) Appl. No.: 12/315,861

(22) Filed: Dec. 5, 2008

Related U.S. Application Data

(60) Provisional application No. 61/005,491, filed on Dec. 5, 2007.

(51) Int. Cl.
*G06Q 30/02* (2012.01)

(52) U.S. Cl.
CPC ..... *G06Q 30/0251* (2013.01); *G06Q 30/0277* (2013.01); *G06Q 30/0255* (2013.01); *G06Q 30/0269* (2013.01)

(58) Field of Classification Search
CPC ............... G06Q 30/02; G06Q 30/0271; G06F 17/30038; G06F 17/30017
USPC .......................................................... 705/14
See application file for complete search history.

(56) References Cited

U.S. PATENT DOCUMENTS

| | | | |
|---|---|---|---|
| 6,411,724 B1 | 6/2002 | Vaithilingam et al. | |
| 7,003,478 B1 * | 2/2006 | Choi | 705/14.73 |
| 2001/0021914 A1 * | 9/2001 | Jacobi | G06Q 30/02 705/14.53 |
| 2001/0054059 A1 | 12/2001 | Marks et al. | |
| 2002/0099600 A1 | 7/2002 | Merriman et al. | |
| 2002/0120501 A1 | 8/2002 | Bell et al. | |
| 2002/0128908 A1 | 9/2002 | Levin et al. | |
| 2002/0133397 A1 * | 9/2002 | Wilkins | 705/14 |
| 2003/0014310 A1 * | 1/2003 | Jung et al. | 705/14 |
| 2003/0046161 A1 * | 3/2003 | Kamangar et al. | 705/14 |
| 2003/0167202 A1 * | 9/2003 | Marks | G06Q 30/02 705/14.69 |
| 2003/0187739 A1 | 10/2003 | Powers | |
| 2003/0191653 A1 | 10/2003 | Birnbaum et al. | |
| 2004/0073485 A1 | 4/2004 | Liu | |
| 2004/0260574 A1 * | 12/2004 | Gross | 705/1 |
| 2005/0033657 A1 * | 2/2005 | Herrington et al. | 705/26 |
| 2005/0071122 A1 * | 3/2005 | Deeds | 702/179 |
| 2005/0119976 A1 * | 6/2005 | Taylor et al. | 705/52 |
| 2005/0256766 A1 * | 11/2005 | Garcia et al. | 705/14 |
| 2005/0256770 A1 | 11/2005 | Popkin et al. | |
| 2006/0074754 A1 | 4/2006 | Toyohara et al. | |
| 2006/0112098 A1 * | 5/2006 | Renshaw | G06F 17/30749 707/999.007 |
| 2006/0195441 A1 * | 8/2006 | Julia et al. | 707/5 |
| 2006/0212442 A1 * | 9/2006 | Conrad et al. | 707/5 |
| 2006/0212444 A1 | 9/2006 | Handman et al. | |
| 2006/0224450 A1 * | 10/2006 | Moon | G06Q 30/02 705/14.36 |
| 2006/0277098 A1 * | 12/2006 | Chung et al. | 705/14 |
| 2007/0067297 A1 | 3/2007 | Kublickis | |
| 2007/0086280 A1 * | 4/2007 | Cappello et al. | 369/30.06 |

(Continued)

*Primary Examiner* — Vincent M Cao

(74) *Attorney, Agent, or Firm* — Polsinelli PC

(57) ABSTRACT

Selecting an advertisement is disclosed. Seed information associated a consumer's preference for audio content is received. An affinity set comprising one or more member items based at least in part on the received seed information is determined. An advertisement associated with at least one item in the affinity set is selected. The advertisement is caused to be displayed to the consumer.

33 Claims, 11 Drawing Sheets

(56) References Cited

U.S. PATENT DOCUMENTS

| | | | |
|---|---|---|---|
| 2007/0112630 A1* | 5/2007 | Lau | G06K 9/72 |
| | | | 705/14.1 |
| 2007/0162335 A1* | 7/2007 | Mekikian | 705/14 |
| 2007/0179854 A1* | 8/2007 | Ziv et al. | 705/14 |
| 2008/0242280 A1* | 10/2008 | Shapiro | H04N 21/25891 |
| | | | 455/414.3 |
| 2008/0250312 A1* | 10/2008 | Curtis | 715/700 |
| 2009/0018898 A1* | 1/2009 | Genen | G06Q 30/0601 |
| | | | 705/26.7 |
| 2009/0030796 A1 | 1/2009 | Snyder | |

* cited by examiner

FIG. 5

TOPSPIN | Sign Out

[ Create | Manage | Report ]

CREATE AN AD CAMPAIGN

Use Artistlink to create a targeted advertising campaign designed to reach fans that will dig your music. Get started immediately: name your campaign, design your ad, target fans, and set your budget.

---

1. Name Your Campaign
(This is for your records.)

[ Enter a Name Here ] ─702

---

2. What Will Your Campaign Look Like?
(Here you get to design the look and feel of your advertisement and check your work with a real-time preview.) ─708

How will my ad look on a web page?

[ Ad Preview ] ─706

Upload a design you have created, ... or use Ad Templates

[ Upload ] ─704
Formats: .jpg, .gif, .swf files up to 50k
Dimension: 300x250, 160x600, or 728x90

Name your design: [Ad design name goes here]

When my fans click my ad, send them here: http://example.com ─710

---

3. Who Will See Your Ad?
(Your ad can be targeted to fans of musical artists, people browsing and listening to genres of music, and to specific geographic regions.) ─712

[ Target Artists ] [ Target Regions ] [ Target Genres ]

---

4. How Much Do You Want to Spend?
(Your budget settings will determine when and how often your ad gets shown to your targeted groups.)

(•) Pay daily with no end date >> Daily Budget: $100.00
[Show Advanced ▼]

( ) Pay for a set time period >>
─714

─716
Estimated Total Clicks
1000-1300 (per day)

FIG. 7

Target Genre
- ☐ Heavy Metal
  - ☐ Speed Metal
  - ☐ Death Metal
  - ☐ Black Metal
  - ☐ Thrash Metal
- ☐ Rock
  - ☐ Classic Rock
  - ☐ Hard Rock
- ◉ Bluegrass
- . . .

(Add Genres)

FIG. 10

TOPSPIN

Sign Out

| Create | Manage | Report |

MANAGE YOUR AD CAMPAIGNS
View campaign performance and make changes to campaign settings.

Filter campaigns by start date:
- ◉ Last 30 Days ▾
- ☐ 11/01/07 – 11/30/07  (Go)

Limit view to:
- ◉ All Campaigns
- ☐ Only Active Campaigns

Select table data:
- ◉ Standard Data
- ☐ Conversion Data

| Campaign Name | Start Date | Status | Views | Clicks | Click Rate | Avg. CPC | Total Spent |
|---|---|---|---|---|---|---|---|
| ☐ Chicago Tour Stop | 1/15/2009 | Not Yet Started | N/A | N/A | N/A | N/A | N/A |
| ☐ San Francisco Tour Stop | 1/1/2009 | Not Yet Started | N/A | N/A | N/A | N/A | N/A |
| ☐ Free Song Download | 12/5/2007 | Active | 2000 | 1000 | 50% | $0.05 | $50.00 |
| ☐ $5 Discount Email Promotion | 11/1/2007 | Paused | 1000 | 20 | 2% | $0.10 | $2.00 |

( Edit )   ( Resume )   ( Pause )   ( Delete )

FIG. 11 ic matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention.
ADVERTISING SELECTION

CROSS REFERENCE TO OTHER APPLICATIONS

This application claims priority to U.S. Provisional Patent Application No. 61/005,491 entitled ARTISTLINK SYSTEM filed Dec. 5, 2007 which is incorporated herein by reference for all purposes.

BACKGROUND OF THE INVENTION

One way that a musician acquires fans is through word-of-mouth. Existing fans expose their friends to the musician's music and/or talk about the musician and eventually that musician may gain at least some of those individuals as additional fans. Unfortunately, this process can be inefficient. For example, musical tastes can vary widely, and while two people may be good friends, they may not share the same musical interests. As a result, a fan of a particular musical group may not have any friends or acquaintances who would also be interested in that group, irrespective of how avid the fan is. The situation is generally aggravated by factors such as the obscurity of the group, and whether the musician is in a niche genre.

BRIEF DESCRIPTION OF THE DRAWINGS

Various embodiments of the invention are disclosed in the following detailed description and the accompanying drawings.

FIG. 5 illustrates an example of an advertisement.

FIG. 7 illustrates an example of an interface for registering an advertising campaign.

FIG. 10 illustrates an example of a portion of an interface for registering an advertising campaign.

FIG. 11 illustrates an example of a portion of an interface for managing an advertising campaign.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
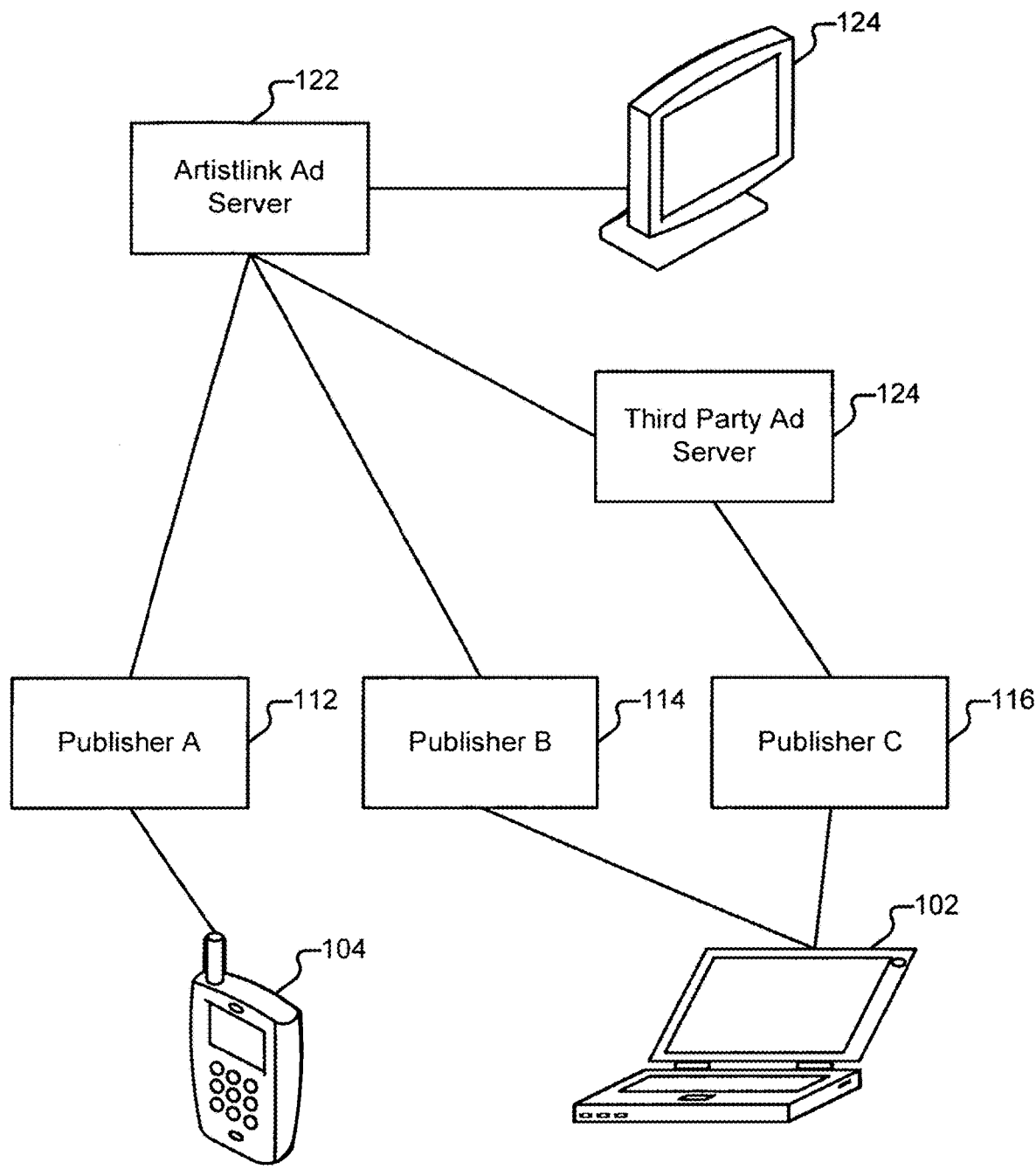
FIG. 1 is a diagram illustrating an embodiment of an environment in which advertisements are selected.

FIG. 1 is a diagram illustrating an embodiment of an environment in which advertisements are selected. In the environment shown, clients, such as clients 102 and 104, are in communication with one or more publishers, such as publishers 112, 114, and 116. Client 104 is a smartphone and publisher 112 is an application installed on client 104 that allows music to be streamed to client 104 and also provides advertisements to client 104 in a graphical interface. Client 102 is a personal computer (e.g., a desktop or portable computer) and publishers 114 and 116 are two websites, each which allows a user of client 102 to listen to music and also causes advertisements to be displayed to client 102.

The techniques described herein can be used to extract from a variety of disparate sources information that can be used to determine relationships among items such as musical artists and songs. Examples of such sources of information include anonymous behavioral and user-specific information including user ratings, play events (e.g. including information such as how frequently a user listens to a particular song or artist, whether the user listens to the entire song, etc.), sales metrics, music genomes, artist defined data, and artist response information. The collected information can then be combined and queried against in a variety of ways.

The techniques herein can be used to select a relevant advertisement to be shown to a consumer based on such relationship information. As described in more detail below, ad server 122 stores advertisements for musical groups and makes determinations of which advertisements to show in which contexts. Musicians (and/or their representatives) can provide information for use in conjunction with an advertising campaign through an interface provided by server 122 and accessible with a client such as client 126. Ad server 122 facilitates the placement of advertisements on music and media providers' sites, other web sites, etc.

Suppose a request is received from a publisher that indicates that an advertisement relevant to the band "Joe's Banjos" should be displayed. In some embodiments server 122 would query for bands associated with Joe's Banjos (e.g., based upon a music genome, associated sales history, and other information) and perform an expansion on the available result set for the query. The results in the set would next be ranked against ratings and play event data to produce the top ten relevant ranked matches. The resulting ranked list could then be further manipulated (e.g., by being compared against campaign performance data) and ultimately an advertisement associated with one of the top results would be selected and returned to the publisher. As described in more detail below, in various embodiments, some steps may be repeated or omitted, and may be performed in a different order. Furthermore, different segments of the data expansion may be weighted, e.g., given the origin of the request. For instance, if publisher 112 submits a request, server 122 may weigh any data previously provided by publisher 112 (or any deemed similar partners) to be more relevant given the origin of the request. Additional rules can also be used, such as bundling returned ads. For example, suppose three ad slots are available and need to be filled with publisher 114. A rule could exist that if Artist A is selected for one of the spots, then Artist B must also be shown, in one of the remaining slots. Another such rule might require that if an ad for Artist C is selected, ads for Artists D-E should not be shown (even if they would otherwise have been selected).

Examples of forms that these advertisements can take include movie clips, banner images, widgets, text, and downloadable media (e.g., .mp3 files). The advertisement may be relatively simple (e.g., in the form of a cost per impression or cost per click advertisement), or it may also be more complicated, such as by being a flash-based player widget that will let the viewer of the advertisement listen to the first 20 seconds of the song by clicking on a play button, will let the viewer of the advertisement download a free track by interacting with the advertisement (e.g., by providing an email address), etc. The advertisement may also be paid for in conjunction with a cost per action accounting (e.g., giving the owner of ad server 122 10% of any revenue made as a result of the consumer interacting with the advertisement). And, in some cases, ad server 122 may be configured to display an advertisement for free (e.g., if it is deemed to be highly relevant, or is in the public interest).

Examples of publishers include Pandora Media, Inc. and Last.fm, Ltd. In some cases, ad server 122 is responsible for providing advertisements directly to clients on behalf of a publisher (e.g., publishers 112 and 114), and in other cases, ad server 122 provides instructions to a third party ad server 124 (such as is provided by DoubleClick or Google) which in turn provides advertisements to clients on behalf of publisher 116.

In some cases, ad server 122 is used to cause the display of advertisements on pages that do not independently provide for the playing of music. An example of this is a blog. Suppose, for example, there exists a blog about an artist "B." The creator of the blog could specify that the blog or blog post content is about artist B via a web interface to ad server 122. In various embodiments, ad server 122 is configured to scan pages such as the blog page for artist or media name occurrences to determine that the blog is about artist B (e.g., as a double check against the information provided by the blog author, or to prevent the blog author from needing to take such actions every time he posts a new message). Ad server 122 (e.g., via a widget that the blog owner embeds in the blog) will then know that the widget should deliver advertisements relevant to artist B, since this is what the blog is about, and it is assumed that the blog readers are interested in B. And, for example, if ad server 122 has in inventory an advertisement for a band C (which has an affinity with B), that advertisement would be shown, while an advisement for a band D (which does not have an affinity with B) would not.

Other entities (not shown) may also interact, either directly or indirectly, with ad server 122. For example, cellular telephones, personal digital assistants, and other types of information appliances such as set-top boxes, game consoles, and digital video recorders may be used as clients, instead of or in addition to clients 102 and 104 as applicable. Similarly, other types of publishers may serve advertisements to such clients.

Figure 2:
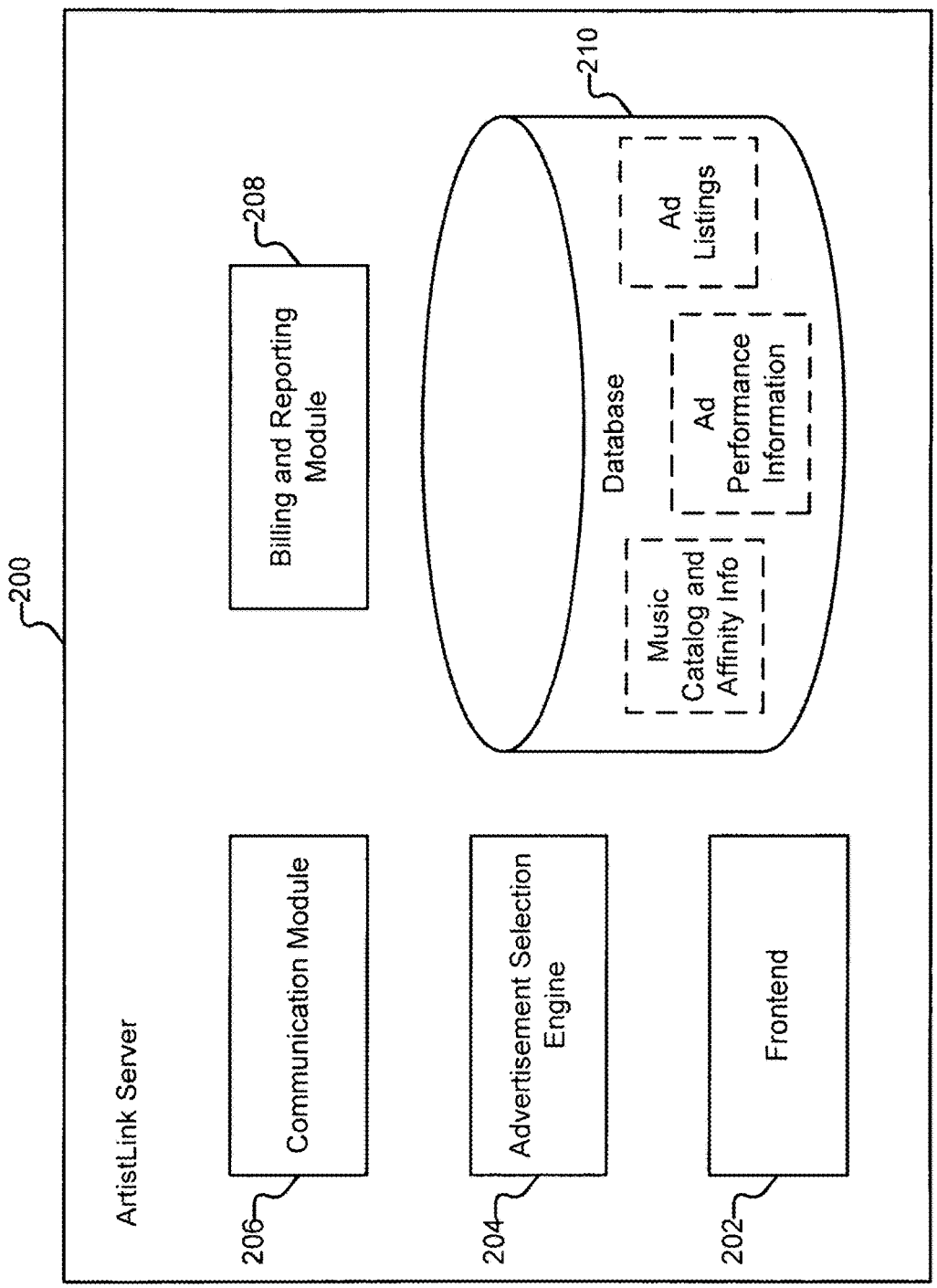
FIG. 2 is a diagram illustrating an embodiment of a system for selecting an advertisement.

FIG. 2 is a diagram illustrating an embodiment of a system for selecting an advertisement. System 200 is configured to deliver highly targeted and relevant advertisements for musical groups (as well as their respective songs, tours, etc.). In the example shown, system 200 includes a frontend 202, an advertisement selection engine 204, a communication module 206, a billing module 208, and a database 210. Database 210 includes information that describes relationships between various subsets of music and media (also referred to herein as "affinities") and is able to accurately target advertisements to the most appropriate advertisement viewer. For example, using system 200, a bluegrass band, "Paul's Pickers," can selectively market itself to fans of other bluegrass artists, without wasting revenue marketing itself to fans of show tunes, opera, or rap.

Determining Affinities

System 200 collects, in database 210, a variety of information that can be used to determine relationships between various subsets of music (or other media). A relationship between two items (e.g., artists, albums, songs, music videos, etc.) implies a similarity (or dissimilarity) between the items. If two items are likely to appeal to the same individual, those two items are referred to herein as having an affinity. Affinities may exist between items that share common properties. For example, if "Paul's Pickers" and "Rich's Reunion" are both bluegrass artists, both groups share a "bluegrass genre" property and thus have at least some degree of affinity. Another example of an affinity that could exist is between a solo artist and a musical group with which the solo artist sometimes performs. Affinities may also typically exist among musical groups sharing a similar region of the country[H] or other properties. Affinities may likewise exist among songs (e.g., having a similar length and a similar beat) or other content, such as music videos and albums. It also possible that people who enjoy a first group may also enjoy a second group, even though those groups are associated with different genres (e.g., one being a rock group, and one being a country group). The fact that a large number of people listen to and enjoy both artists (e.g., using techniques described below) would be stored as an affinity in database 210.

Negative affinities may also exist. For example, a musical group who wishes to engage in an advertising campaign may specifically request that fans of a particular other musical group not be targeted, even though they may be very similar.

Information that can be used in determining relationships between items can be collected from a variety of disparate sources (e.g., publishers 112-116). For example, the owner of system 200 may engage in a partnership with publishers to receive information such as collaborative filter information (e.g., from a publisher such as Pandora), play events (e.g., from a publisher such as Last.fm), ratings (e.g., from a publisher such as LAUNCH), and sales data (e.g., from a publisher such as Amazon or an auction system such as eBay). A third-party music catalog service, such as is provided by Macrovision Corporation's "All Music Guide," can also be mined for artist, media, and relationship information, and that information also stored in database 210.

In some embodiments operational data from partners is gathered at set intervals through data delivery services, either from a push by the publisher to system 200 (e.g., using POST) or from a pull by system 200 (e.g., using GET). The data can be transmitted either in a raw dump format or using an encapsulation format such as XML. It is normalized, and then submitted to database 210. For example, different publishers may refer to the same musical item (e.g., a band) by a different identifier. System 200 is configured to cross-match the various instances of the item's information, such as by using the All Music Guide identifiers as database keys. In various embodiments, a robust relational database management system is used in conjunction with database 210.

Another way information can be obtained is through self-selected relationships. A self-selected relationship is one defined by an account holder of system 200 (such as an artist who wishes to conduct an advertising campaign). For instance, if the bluegrass band "Paul's Pickers" wanted to always be associated with "Rich's Reunion" and the bluegrass genre, they could define and input those relationships directly through a software interface provided by frontend 202. As another example of self-selected relationships, an upcoming group may establish a relationship with a well-known band for touring purposes or as part of a special project. In various embodiments, account holders of system 200 may access the system to remove relationships that they think are invalid, and may add relationships they think are important, accordingly.

Information can also be obtained through data scrubbing and generated feedback. In the case of data scrubbing, system 200 is configured to crawl selected published sites (e.g., music blogs, fan pages, college radio station sites, etc.) and collect information based upon artist, music genre/affinity and related content as it appears, storing it in database 210. For example, using collaborative filtering techniques, it may be discovered that when an artist M appears on a web page, artists N and O will also have a high likelihood of appearing on the page, suggesting that M, N, and O share an affinity. Generated feedback information includes the lifetime performance data of other advertising campaigns maintained by system 200. For example, conversion rate by placement, conversion rate by user demographics, and conversion rate by established affinity relationships may all be analyzed to determine affinities.

In addition to querying public/private web sites and services, other techniques can also be used to find related items. For example, signal processing algorithms can be used to determine that artists X and Y have similar sonic qualities as an artist Z.

Once collected, the relationship-related information can be mined to generate affinity listings in a variety of ways. Suppose information has been collected from a variety of sources pertaining to the musical group, "The Oranges." For example, Last.fm has provided a list of artists that it believes are similar to the Oranges based on its own observations. Last.fm is a social music service that collects information from millions of users about what they listen to. If a particular Last.fm user has played songs by the Oranges five times today and six times yesterday, Last.fm can be made aware of this through a client installed on that user's computer. Last.fm analyzes such information from all of its users and makes relationship information available. Suppose Last.fm believes that five bands are related to the Oranges (e.g., bands A, B, C, D, and E). In contrast, Amazon (which also analyses its own information) believes that the Oranges are related to only three bands (e.g., bands A, B, and F) based on its sales data. The All Music Guide includes information that relates the Oranges to four bands (e.g., bands A, B, C, and G). System 200 stores these three sets of relationship information (from Last.fm, Amazon, and the All Music Guide) in database 210.

System 200 may use a variety of techniques for ingesting/reconciling the different relationship information. For example, system 200 may concatenate all of the received relationships and store in database 210 that the Oranges have an affinity with bands A, B, C, D, E, F, and G. System 200 may also employ thresholds, requiring, for example, that at least two sources state a relation before it is included in database 210. In that situation, only bands A, B, and C would be included as affinities of the Oranges in database 210. Scores can also be used to weight whether two items have an affinity or to define how much of an affinity any two items have for one another. In some embodiments, all relationship information from all sources is stored (along with an indication of from which publisher the relationship information was received). Later, e.g., when system 200 needs to determine which artists have an affinity with a received artist, system 200 can weight the relationship information based on the source that provided it. For example, if publisher 112 requests an advertisement to show to a user who is listening to a particular song, system 200 may weight the relationship information previously provided by publisher 112 over relationship information provided by publisher 114 when determining affinities. As described in more detail below, the affinity information (e.g., that the Oranges have an affinity with bands A, B, and C) stored in database 210 can be used to select advertisements.

Selecting an Advertisement

Suppose a user, Alice Jones, is using client 102 to listen to music via publisher 114's website. Publisher 114 has a service in which users select one or more artists (or songs) that they like and a "radio station" (also referred to herein as a channel) is created for the user based on that selection. The user may listen to music for free in exchange for being shown advertising. When publisher 114 needs to show an advertisement, it communicates with system 200 via communication module 206. Publisher 114 provides to system 200 information such as the current song Alice is listening to, the last ten songs she listened to, the artist(s) and/or song(s) she used to seed her channel, and/or any other appropriate information. This information is also referred to herein as "seed" information. Advertising selection engine 204 determines one or more appropriate advertisements for publisher 114 from among a pool of candidate advertisements stored in database 210 and responds to publisher 114 with instructions on which advertisement(s) should be displayed to Alice.

A variety of techniques can be used to select an advertisement. For example, upon receipt of the request from publisher 114, in some embodiments system 200 expands the received artist (or song) into a group including the received artist (or song) and any artists (or songs) having an affinity for the received artist (or song). Once the expanded group of items is determined, advertising selection engine 204 examines its inventory of ad listings (e.g., as stored in database 210) and determines the most appropriate advertisement (or set of advertisements) to return to publisher 114.

Depending on a variety of factors, the group may be small (e.g., less than ten artists) or the group may be very large (e.g., including hundreds of items or more). Accordingly, it may be the case that none of the artists in the group have an associated advertisement or it may be the case that many of the artists have an associated advertisement. Suppose Alice is listening to a channel that she created using band "A" as a seed. According to information included in database 210, band A shares affinities with bands B, C, and D—making a total of four items in the initial group. One way of expanding the group further, if an insufficient number of items are included is to include in the group all of the affinities for all of the bands in the initial group. For example, bands A, B, C, D, K, L, P, R, S, W, X, and Z may represent an expanded group of bands having an affinity with A, B, C, or D, with B, C, and D having an affinity with A. As applicable, the items in the group may be ranked or sorted, e.g., based on how much affinity each item shares with A.

In some embodiments, in selecting an advertisement, advertisement selection engine 204 takes into consideration the context in which the advertisement will be displayed. For example, advertisements that perform well (e.g., garner many clicks) on one publisher's site may not perform as well on another publisher's site. Context can include the publisher's identity, as well as other information such as personal information about the user to whom the advertisement will be shown. For example, if the user has previously interacted with system 200, the user's browser might have a cookie which can be read by system 200 such that the same advertisements aren't repeatedly shown to the user when other relevant ads are also available. As another example, the user's location can be determined (e.g., from IP address information, from profile information, etc.) and advertisements can be tailored accordingly. When a Denver user and a New York user both listen to a particular band's music on publisher 112, the Denver user may be shown an advertisement for an upcoming tour stop in Denver, while the New York user would be shown an advertisement for a song (if the band is not planning any tour stops near New York).

Some considerations that system 200 will take in to account when selecting an advertisement include the direct financial implications of displaying different advertisements—both in terms of how much it will cost the owner of system 200 to cause an advertisement to be displayed, and also in terms of how much revenue will be generated (or potentially generated in the case of a cost-per-click or cost-per-action) by selecting that advertisement. System 200 tracks the clickthrough rates (and other applicable rates) for advertisements with billing and reporting module 208 to measure the performance of those advertisements, and to account for the charges that should be made to the advertising musician. Performance information can be used for purposes such as refining the affinities received from multiple sources down to the best set of affinities, to maximize revenue, and to allow the advertising musician to determine which advertisements are most effective. In various embodiments billing and reporting module 208 is configured to expose such information to the advertising musician, such as through a graphical interface, email reports, etc. In some embodiments system 200 records downstream events, such as purchases made by those who view advertisements, and downstream event reporting is also provided to the advertising musician via billing and reporting module 208.

In the example shown in FIG. 1, server 122 is serving advertisements for three different publishers A (112), B (114), and C (116). Each of these publishers has a user base with its own specific properties. For example, users of publisher A may tend to be younger than those of publisher C. System 200 can exploit these differences when serving advertisements. For example, it is possible that an advertisement for one artist can generate large interest on publisher A but not publisher B. If this were the case, system 200 would want to show the advertisement for such an artist only on publisher A and never on publisher B in order to maximize efficiency. Another consideration for the multi-publisher scenario involves the amount of money it costs to serve an advertisement on each publisher. If publisher A charges ten times less than publisher B to show an advertisement, system 200 will be aware of this. In some embodiments System 200 will not show advertisements for an artist if it is a losing proposition. Using the above example of the artist who generates interest on publisher A but not on publisher B, if it is much cheaper to advertise on publisher A, system 200 will be further inclined to focus a majority of its efforts advertising the artist on publisher A over publisher B.

In some embodiments system 200 and server 122 are the same device. In various other embodiments, portions of system 200 are included in server 122 and other portions are omitted or provided by a third party. For example, portions of database 210, such as the music catalog data, may be provided by a third party, such as Macrovision's All Music Guide. Additionally, in some embodiments, the infrastructure provided by portions of server 122 (or system 200) is located on and/or replicated across a plurality of servers rather than the entirety of server 122 (or system 200) being collocated on a single platform. Such may be the case, for example, if the contents of database 210 are vast and/or there are many simultaneous communications made between server 122 and entities such as clients and publishers. Further, whenever server 122 (or system 200) performs a task (such as receiving information from publishers, selecting an advertisement, etc.), either a single component or a subset of components or all components of server 122 (or system 200) may cooperate to perform the task.

Figure 3:
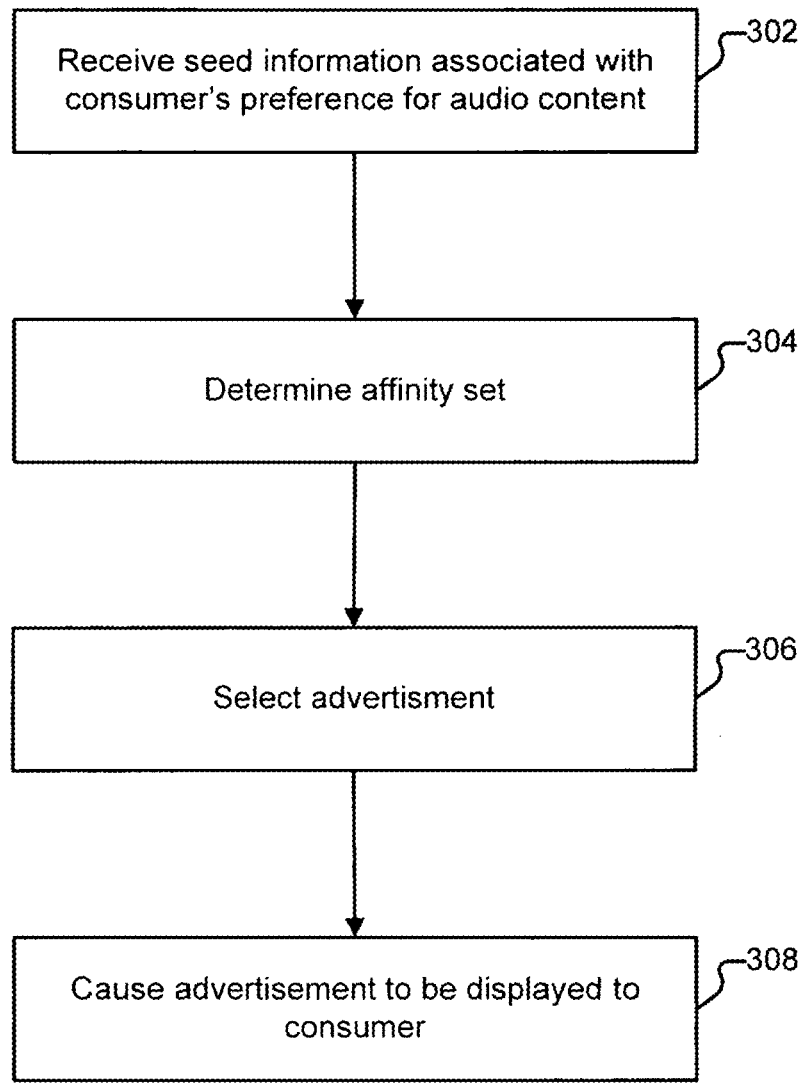
FIG. 3 illustrates an embodiment of a process for selecting advertisements.

FIG. 3 illustrates an embodiment of a process for selecting advertisements. In some embodiments the process shown in FIG. 3, or portions thereof, are performed on system 200. The process begins at 302 when seed information associated with a consumer's preference for audio content is received. When publisher 112 requests an advertisement from system 200, the information provided by publisher 112 to system 200 is an example of the seed information received at 200. Such seed information could include the song the consumer is currently listening to, the last several songs the consumer has listened to, a channel to which the consumer is currently listening, and/or other information that indicates the consumer's preference for audio content. As one example, a publisher, such as publisher 116, embeds a string such as the following in the page with which a client, such as client 102 interacts: <script src="http://ad.somewhere.net/adj/tps.publisherc/artist=R17149">. In this example, "artist=R17149" is the identifier that publisher 116 uses for Rich's Reunion—alerting the advertising server, whether it be server 122 or third party server 124—that the consumer to whom an advertisement should be shown, is currently listening to Rich's Reunion.

At 304, an affinity set is determined. For example, at 304, system 200 the seed information received at 302 to determine an expanded set of items for which the consumer is likely to have a preference. As one example, if the artist, "Alice's Alligators" is received at 302, at 304, an affinity set including Alice's Alligators and ten other groups might be determined at 304 using information included in database 210. Similarly, if a song title was received at 302, an affinity set including several songs that are similar to the received song might be determined at 304 accordingly. In various embodiments, the affinity set includes a mixture of types of items—such as by including both songs and artists that have an affinity for the seed.

At 306, an advertisement is selected. For example, for each of the items in the affinity set, a determination is made as to which items in the affinity set have advertisements in the database targeting them. The advertisement or advertisements having the highest likely return are selected at 306. At 308 the selected advertisement is caused to be displayed to the consumer. In the case of publishers 112 and 114, the advertisement may be returned directly by ad server 122. In the case of publisher 116, a variety of techniques can be used to cause the third party ad server 124 to return the appropriate advertisement. Additional examples follow:

Suppose user Joe Smith is currently listening to the band Rich's Reunion on publisher 114. The page containing the audio player for Rich's Reunion's music also serves advertisements. An advertising module on the page contacts system 200 and requests an advertisement to be shown in the context of user Joe Smith, listening to Rich's Reunion (on publisher 114). System 200 will send the most appropriate advertisement for Joe Smith given all available advertisements. Suppose in this example that system 200 currently has two other artists that want to target users like Joe Smith listening to Rich's Reunion Paul's Pickers and Bob's Banjos are two distinct bluegrass artists who are both using system 200 to sell their new music. Both of these bands believe that showing their advertisements to Rich's Reunion fans like Joe Smith will generate interest.

In this example, system 200 must choose which ad to show to Joe Smith—either the advertisement for Paul's Pickers or Bob's Banjos. System 200 evaluates data such as past performance data, to arrive at a choice. In this example, the advertisements for both artists have been shown to many other users listening to Rich's Reunion besides Joe Smith. According to the historical performance data, when shown to 1000 users, not a single user listening to Rich's Reunion has clicked on the Paul's Pickers advertisement. However, the Rich's Reunion users have a high propensity to click on the Bob's Banjos advertisement. When the advertisement for Bob's Banjos is shown to 1,000 users on publisher 114 listening to Rich's Reunion, 500 (50%) of the users click on the advertisement.

Suppose it costs the owners of system 200 one dollar to show an advertisement to 1,000 users. In this example, the owners of system 200 will only make money when someone clicks on the advertisement. And, whether it is a click on Paul's Pickers or Bob's Banjos advertisement, the owners of system 200 will only make $0.01 per advertisement click. Based on historical performance data, showing the Paul's Pickers advertisement on publisher 114 cost the owners of system 200 one dollar, and generated no money (because it generated no clicks). In contrast, the Bob's Banjo's advertisement, while also costing the owners of system 200 one dollar to display to 1,000 users has resulted in revenue of five dollars from the 500 clicks (since each of the clicks was worth $0.01). Accordingly, when server 200 needs to determine whether to cause the Paul's Pickers or the Bob's Banjos advertisement to be displayed to Joe Smith, system 200 will select the Bob's Banjos advertisement.

In the above example, it was assumed that Bob's Banjos and Paul's Pickers were the only advertisements available and those advertisements could only be shown on publisher 114. As shown in FIG. 1, system 200 is likely to provide advertisements for a variety of publishers—not just a single publisher. Suppose another user, Alice Jones, is listening to Rich's Reunion via publisher 112. Like publisher 114, publisher 112 requests an advertisement from system 200. Once again, system 200 must choose between showing the Paul's Pickers advertisement and the Bob's Banjo's advertisement. As with publisher 114, the owners of system 200 will receive $0.01 per advertisement click—whether it be on the Paul's Pickers or the Bob's Banjos advertisement. It costs the owners of system 200 two dollars to show an advertisement to 1,000 users. Unlike the experience with publisher 114, however, the Paul's Pickers advertisement is much more successful on publisher 112. Paul's Pickers generates 300 clicks when shown to 1,000 users on the Rich's Reunion page on publisher 112, whereas the Bob's Banjo's ad generates no clicks when shown to 1,000 users. From the historical performance data on publisher 112, Paul's Pickers made $3.00 while Bob's Banjos made $0.00. So, while the Bob's Banjos advertisement works best in the context of publisher 114, it would be prudent for system 200 to return the Paul's Picker's advertisement on the Rich's Reunion page on publisher 112.

In both of the above examples, system 200 directly serves advertisements to publishers. However, as shown in FIG. 1, in some cases, advertisements may be served by a third party ad server such as third party ad server 124. In such a scenario, system 200 will integrate with the third party ad server 124 in order to ensure the appropriate advertisement is shown to the end user. Suppose it is determined (e.g., based on historical performance data) that system 200 would prefer that users of publisher 116 be shown Bob's Banjos advertisement in the context of Rich's Reunion. If the advertisement request on the Rich's Reunion page on publisher 116 requested advertisements directly from system 200, system 200 would return Bob's Banjos advertisements directly as appropriate. However, in this scenario, the third party advertising server is responsible for serving the advertisement. One way of ensuring that the correct advertisement is served by the third party advertising server is as follows. Periodically (e.g., as part of a nightly batch process), the third party advertising server provides system 200 with data that includes which advertisements were shown to which users, including the time the advertisements were displayed, the geographic location of the users, whether the users clicked the advertisements, etc. Based on this information, system 200 will be able to calculate how many Rich's Reunion fans saw the Bob's Banjos advertisement and how many saw the Paul's Pickers advertisement. As with the other examples, system 200 will be able to determine what mix of Paul's Pickers and Bob's Banjos advertisements ought to be shown on publisher 116 whenever users access Rich's Reunion content. System 200 will ingest the periodic data provided by the third party advertising server and will return instructions to the third party advertising server on which advertisements to show when.

Figure 4:
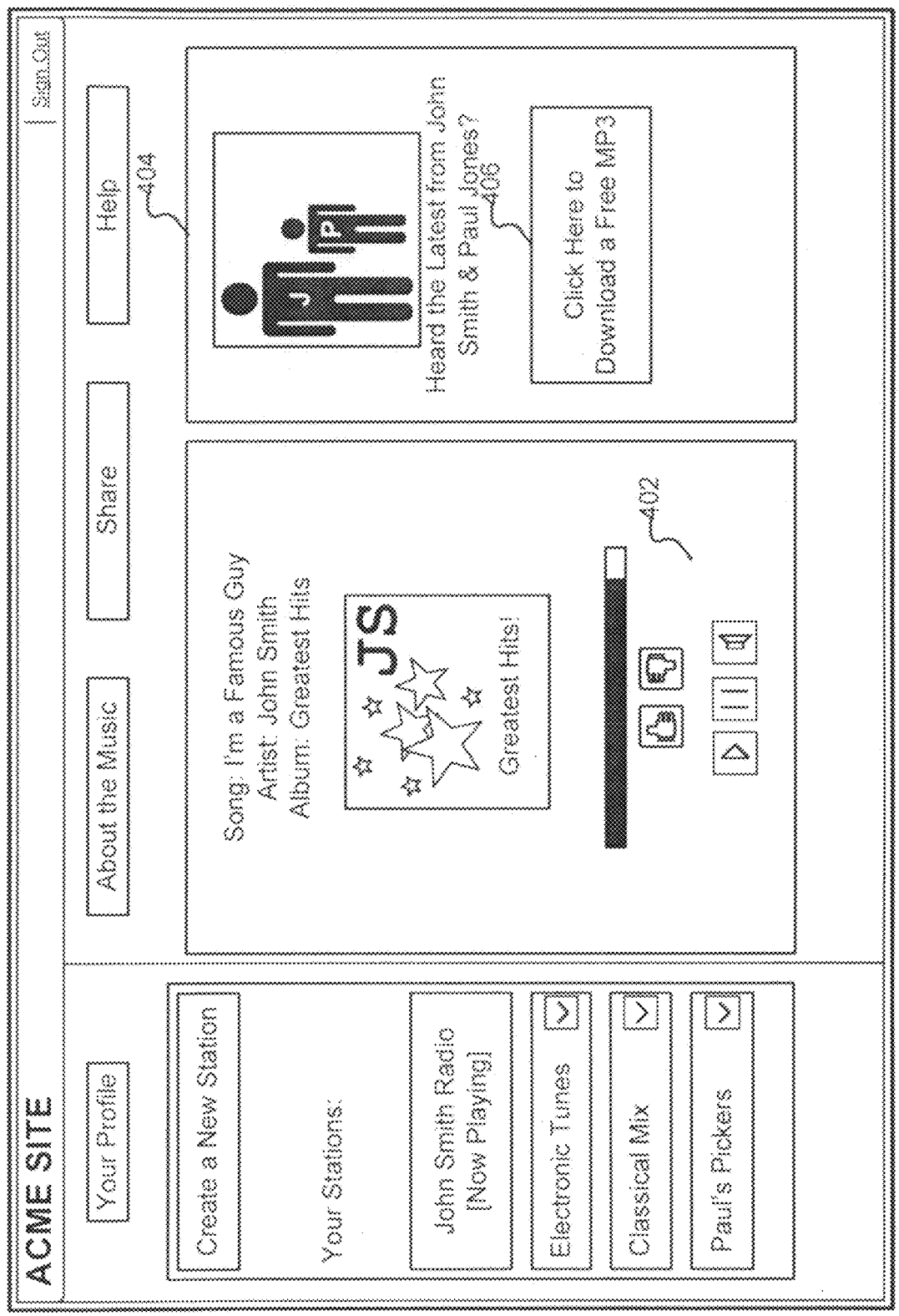
FIG. 4 illustrates an example of an advertisement.

FIG. 4 illustrates an example of an advertisement. In the example shown, a user is visiting publisher 114's website and is listening to an older song by the artist, John Smith, off the artist's greatest hits album. John Smith has recently partnered with another musician, Paul Jones to form a duet group. John Smith and Paul Jones are seeking exposure for their new album by advertising to existing fans of John Smith's solo music. Controls for playing John Smith's existing music are shown in region 402. Region 404 depicts the advertisement selected for the user of publisher 114's site through the process shown in FIG. 3. If the user selects region 406, he will be presented with a downloadable MP3 music file that he can listen to. In various other embodiments, the advertisement may be a purely display advertisement (and not lead to a free song).

Figure 5:
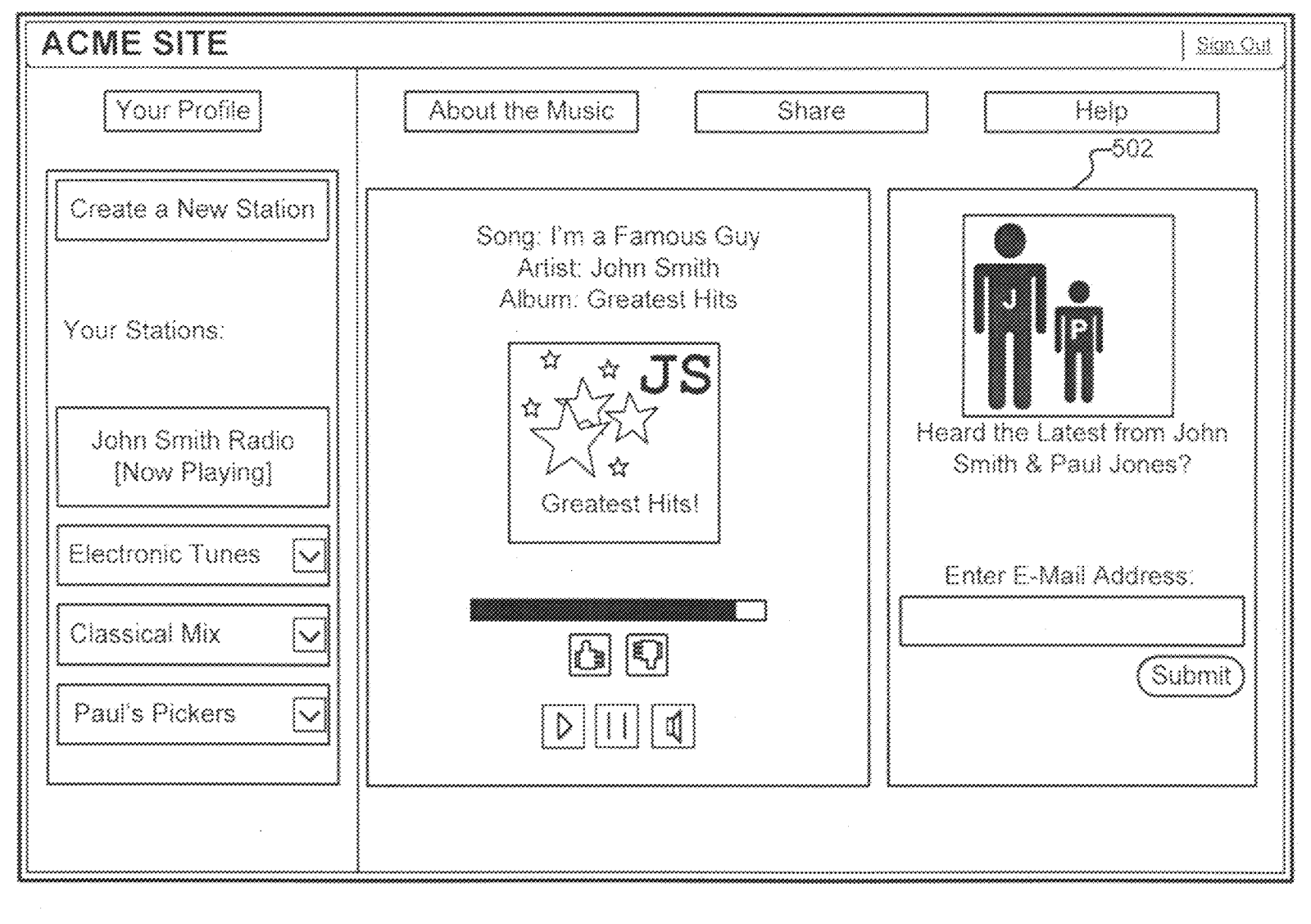

FIG. 5 illustrates an example of an advertisement. As with the example shown in FIG. 4, the new duet group, John Smith and Paul Jones are paying to advertise their new album to existing fans of John Smith (and his solo career). In this example, rather than being given a free MP3 track for interacting with advertisement 502, the user's email address is solicited. If the user completes the request and selects the "submit" button, the user will be subscribed to a mailing list that provides announcements related to the new duet group. In order to entice a user to provide his or her email address, the advertisement might be configured to promise something in exchange for providing an email address, such as a discount, or access to a limited time download.

Figure 6:
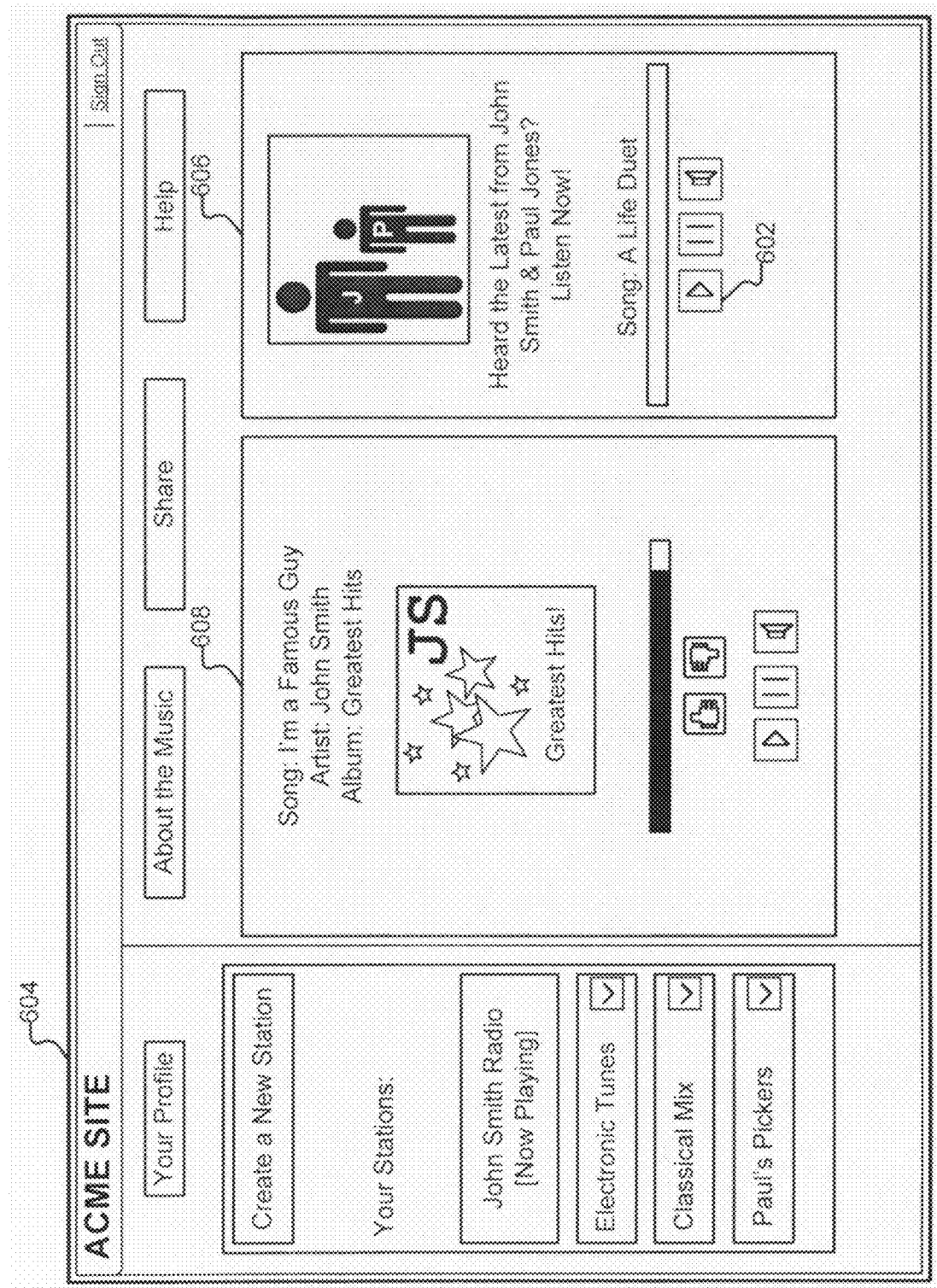
FIG. 6 illustrates an example of an advertisement.

FIG. 6 illustrates an example of an advertisement. As with the example shown in FIGS. 4 and 5, the new duet group, John Smith and Paul Jones are paying to advertise their new album to existing fans of John Smith (and his solo career). In this example, the advertisement is in the form of an interactive widget. The user can listen to a song by John Smith and Paul Jones by selecting control 602. In various embodiments, the code on page 604 is configured so that when a user interacts with a control in region 606, any music being played in region 608 is automatically paused.

FIG. 7 illustrates an example of an interface for registering an advertising campaign. Using the interface shown, an artist, such as the newly formed John Smith and Paul Jones duet group, can create and maintain an advertising campaign to obtain new fans by targeting those consumers most likely to find the group appealing. The interface shown is an example of what would be presented to client 126 by server 122 via frontend 202. The data collected via the interface shown in FIG. 7 will be stored in some embodiments in database 210.

Suppose John Smith and Paul Jones wish to create a new campaign. They would like to advertise to existing John Smith fans in general. They would also like to promote their upcoming one-night-only performance that will be held in San Francisco. They can accomplish both of these tasks using the interface shown in FIG. 7, for example, by creating two different campaigns—one targeting John Smith fans, and one targeting John Smith fans (and fans of artists similar to John Smith) who live reasonably near San Francisco. To make a campaign, the artists first enter an internal name (e.g., "Appeal to existing John Smith fans" or "Promote SF show") for one of the campaigns in region 702. Next, the artists upload an image in region 704 (e.g., pictures of themselves for the John Smith fan campaign, and a large "one night only" image for the San Francisco campaign). Instead of or in addition to uploading images, the artists could also make use of advertisement templates to generate advertisement content. They can include multiple advertisements for a single campaign (e.g., different sizes, different colors, etc.) and can preview the advertisement in region 706 or by following link 708. In region 710, the artists can specify what should happen when a consumer clicks on their advertisement. For example, a landing page can be specified, or the location of a file can be provided in the case of a free MP3 download.

Next, the artists define who they want to target with their advertising by interacting with one or more of the buttons shown in region 712 and described in more detail below.

Finally, in region 714, the artists select how much money they wish to spend on the campaign, and in what manner. By selecting the "Show Advanced" dropdown, the artists can provide more refined instructions, e.g., on how money should be allocated—including whether advertisements may be placed on any publisher served (whether directly or indirectly) by system 200, whether advertisements should be limited to a particular publisher, or to a particular time of day, etc.

In region 716, the estimated total clicks that the campaign will receive per day is shown. One way of estimating the total clicks per day (or other unit of time) is as follows. First, estimate the number of impressions per day that will occur. Such an estimate can be determined by examining all of the artists that the campaign wants to target and also examining the available inventory for those artists. Other factors such as geography and amount that the campaign is willing to spend per click can also be considered. Once an estimate of impression counts per day is made, it can be multiplied by a baseline estimate of click rate.

For example, if a campaign is targeting an obscure band (Bob's Banjos), it is likely that only a very small number of users of publisher 114 that can be reached. Suppose Bob's Banjos only has two fans per day (e.g., those people who listen to a channel based on Bob's Banjos) on publisher 114. If a baseline of 50% percent is used (i.e., that 50% of publisher 114 users will click on the advertisement), the campaign targeting Bob's Banjos will receive an estimated click count of 1 per day. If the campaign choose to target two bands—both Bob's Banjos, and a famous band (Famous Guys), the estimated click count will increase since Famous Guys has 1 million fans per day on publisher 114. In this scenario, applying the same 50% estimated click rate to Famous Guys fans will give the campaign an estimated 500,000 more clicks, for a grand total of 500,001 estimated clicks per day.

Other techniques for generating estimates can also be used. For example, instead of applying a uniform base estimate of 50%, more customized estimates may be employed, e.g. based on historical data collected from other campaigns. As another example, if the campaign is targeting a particular region, the baseline estimate may be adjusted upward or downward based on factors such as the number of fans that exist in that region relative to the country (or world) at large. Yet another factor that can be considered in the estimate is whether other campaigns seek to target the same artist(s).

Figure 8A:
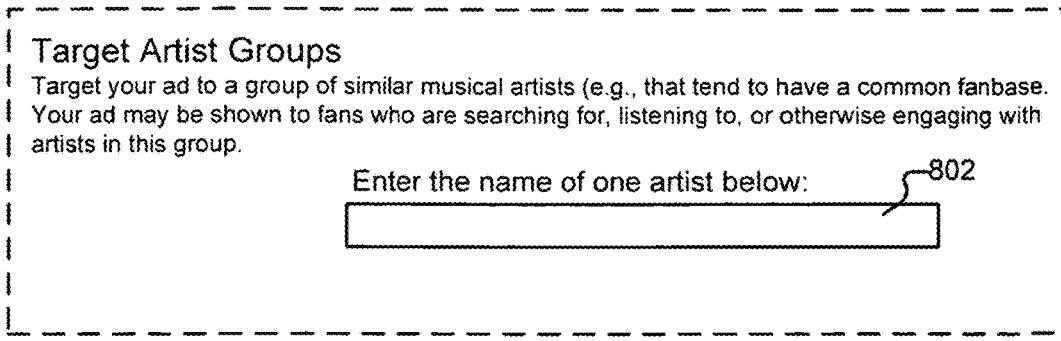
FIG. 8A illustrates an example of a portion of an interface for registering an advertising campaign.

FIG. 8A illustrates an example of a portion of an interface for registering an advertising campaign. In the example shown, the artists John Smith and Paul Jones have selected the "Target Artists" button appearing in region 712 of the interface shown in FIG. 7. In doing so, they are presented with an interface into which they may type the name of an artist whose fans they would like to target. For example, one artist that they would want to target is John Smith himself. They could do so by entering his name into region 802.

Figure 8B:
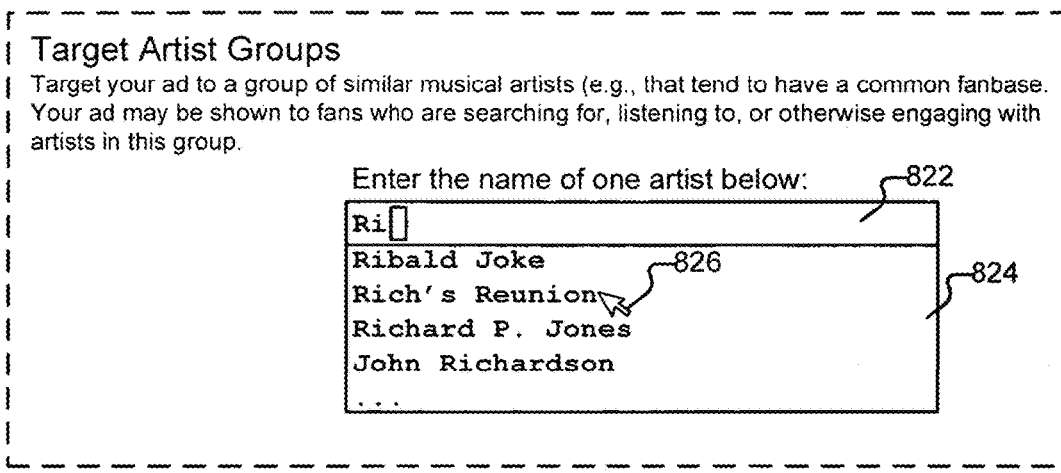
FIG. 8B illustrates an example of a portion of an interface for registering an advertising campaign.

FIG. 8B illustrates an example of a portion of an interface for registering an advertising campaign. As mentioned previously, suppose that one aspect of advertising in which John Smith and Paul Jones wish to engage is the promotion of their one-night-only show in San Francisco to fans of music similar to John Smith and Paul Jones who live reasonably near San Francisco. Also suppose that John Smith and Paul Jones believe that they are similar to the performer Rich's Reunion. They begin entering "Rich's Reunion" into region 822 of the interface shown in FIG. 8B. As they type, in region 824, artists with names similar to that being typed in region 822 are displayed. Instead of fully typing in "Rich's Reunion," they may select that artist by clicking on region 826.

Figure 8C:
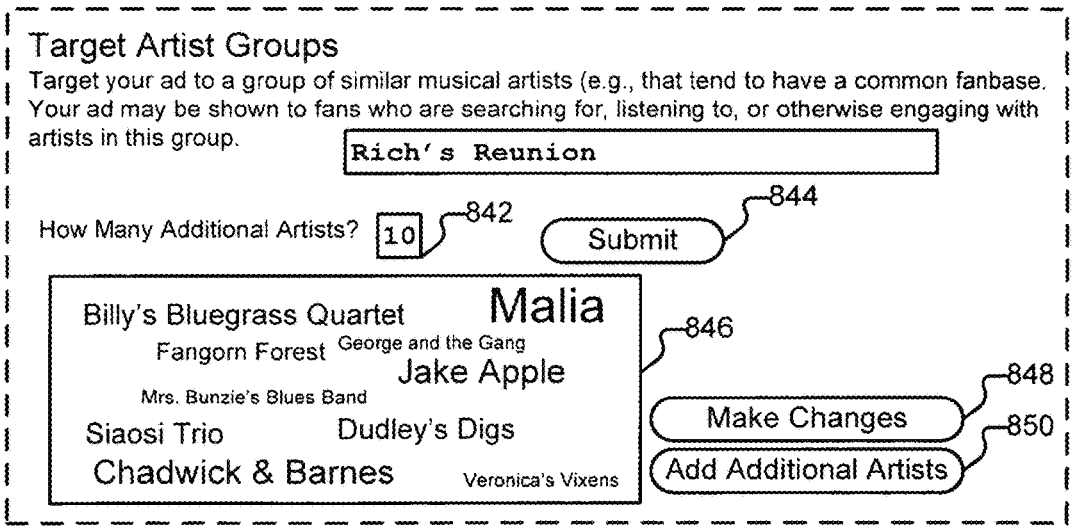
FIG. 8C illustrates an example of a portion of an interface for registering an advertising campaign.

FIG. 8C illustrates an example of a portion of an interface for registering an advertising campaign. In the example shown, the artists John Smith and Paul Jones have selected the name "Rich's Reunion" by clicking on region 826 of the interface shown in FIG. 8B. They are then presented with the interface shown in FIG. 8C. In this interface, the artists may refine how many additional artists they would like to target. These artists will represent the "n" artists who are most like Rich's Reunion. In the example shown, John Smith and Paul Jones have elected to target the ten additional artists who are most like Rich Reunion, by typing the number "10" into region 842 and selected button 844. After selecting button 844, the ten artists most similar to Rich's Reunion are displayed in region 846. If John Smith and Paul Jones are satisfied with targeting the artists shown in region 846, they can confirm that they would like to target a total of 11 artists (including Rich's Reunion) by selecting region 850. If they wish to make any changes to the artists they wish to target, they may select region 848.

In the example shown, the ten additional artists are depicted in a cloud visualization in which artists which are more popular are presented in a larger font than less popular artists. Other visualizations may also be used. For example, instead of a cloud visualization, a sorted listed may be returned. Similarly, the cloud may use the relative affinity of each of the bands to Rich's Reunion rather than the universal popularity of each artist as a basis for font size when rendering.

Figure 9:
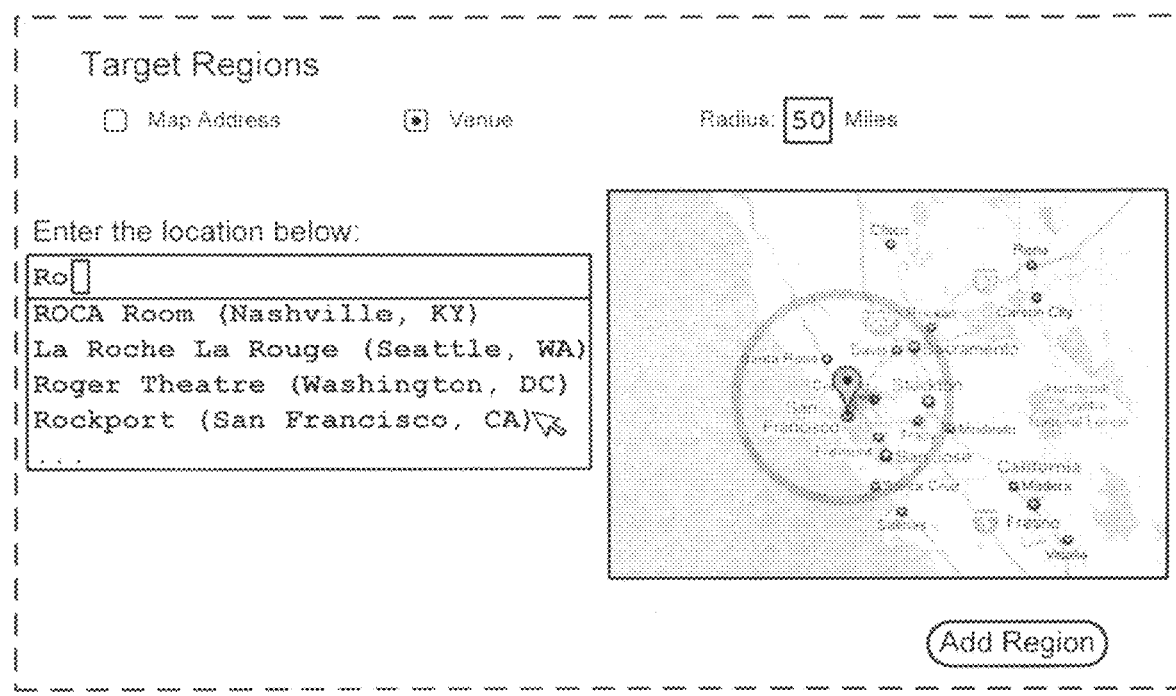
FIG. 9 illustrates an example of a portion of an interface for registering an advertising campaign.

FIG. 9 illustrates an example of a portion of an interface for registering an advertising campaign. In the example shown, John Smith and Paul Jones have returned to the interface shown in FIG. 7, and have selected the "Target Regions" button shown in region 712. Recall that John Smith and Paul Jones would like to target fans of artists similar to John Smith, who also live in the San Francisco Bay Area. Using the interface shown in FIG. 9, John Smith and Paul Jones indicate the location of their performance— the "Rockport" in San Francisco, and target a region having a 50 mile radius from that venue. They could also specify a street address, ZIP code, or other region information in the interface shown in FIG. 9.

FIG. 10 illustrates an example of a portion of an interface for registering an advertising campaign. In the example shown, John Smith and Paul Jones have returned to the interface shown in FIG. 7, and have selected the "Target Genres" button shown in region 712. Suppose that one of the differences between John Smith's solo career and his new duet career with Paul Jones is that his musical style has shifted away from contemporary rock toward bluegrass. Accordingly, John Smith and Paul Jones would really like to target those fans who live near San Francisco, who like John Smith, but also who have at least some leanings toward liking bluegrass. They may use the interface shown in FIG. 10 to further refine the type of consumer to which their advertising should be targeted. In the examples described in conjunction with FIGS. 7-10, the targeting refinement is an "AND" refinement—fans must meet all of the requirements. In various other embodiments, the targeting refinement may be an "OR" refinement and/or free-form targeting may be supported so that, for example, John Smith and Paul Jones could construct Boolean descriptions of their ideal target. For example, in various embodiments John Smith and Paul Jones could explicitly require that the eleven bands whose fans are being targeted all be within the bluegrass genre, or require that only male fans under the age of 30 be targeted, etc.

FIG. 11 illustrates an example of a portion of an interface for managing an advertising campaign. In the example shown, an artist may obtain information on how existing advertising campaigns are performing, may pause and modify existing campaigns, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory coupled with the processor, wherein the memory is configured to provide the processor with instructions which when executed cause the processor to:
      receive a request to display an advertisement on a graphical user interface of an electronic device, wherein the request includes seed information including data describing a song associated with a first musical artist currently being played at the electronic device;
      in response to receiving the request including the seed information, determine a plurality of candidate advertisements at least on part by:
         determining, using the received seed information, an affinity set comprising one or more member items determined to have an affinity with the seed information, wherein the affinity is based on at least one shared common property from at least two sources between the seed information and a member item; and
         in response to determining that a member item of the determined affinity set is targeted by one or more available advertisements, including the one or more available advertisements targeting the member item in the plurality of candidate advertisements, wherein the one or more candidate advertisements promote a second musical artist; and
      cause an advertisement selected from the plurality of candidate advertisements at a time contemporaneous to the playing of the current song to be displayed on the graphical user interface of the electronic device, wherein the advertisement includes an interactive element for initiating playback of a song of the second musical artist and stopping playback of the song with the first musical artist currently being played.

2. The system of claim 1 wherein the seed information includes a plurality of songs played at the electronic device prior to the playing of the current song.

3. The system of claim 1 wherein the seed information includes a plurality of artists for which the electronic device has designated a preference.

4. The system of claim 1 wherein the at least one common shared property is a musical content.

5. The system of claim 4 wherein the musical content comprises an album.

6. The system of claim 4 wherein the musical content comprises a song.

7. The system of claim 4 wherein the musical content comprises a music video.

8. The system of claim 1, wherein the at least two sources are third party sources.

9. The system of claim 8 wherein the plurality of third party sources includes two or more different publishers.

10. The system of claim 1 wherein at least one member item is included in the affinity set based at least in part on information provided by an artist prior to the selection of the advertisement.

11. The system of claim 1 wherein the advertisement caused to be displayed is selected at least in part by selecting a publisher from a plurality of publishers.

12. The system of claim 1 wherein the advertisement caused to be displayed is selected at least in part by evaluating the plurality of candidate advertisements.

13. The system of claim 12 wherein evaluating the plurality of candidate advertisements includes determining a cost associated with displaying each of the plurality of candidate advertisements.

14. The system of claim 12 wherein evaluating the plurality of candidate advertisements includes determining a likelihood of a consumer taking an action.

15. The system recited in claim 1, wherein the memory is further configured to provide the processor with instructions which when executed cause the processor to:
determine a location associated with the electronic device.

16. The system of claim 15 wherein selecting the advertisement caused to be displayed includes comparing the location associated with the electronic device against a location associated with the advertisement.

17. The system of claim 1 wherein causing the selected advertisement to be displayed includes enabling a second song associated with the second musical artist to be played at the electronic device by interacting with the advertisement.

18. The system of claim 1 wherein the seed information includes an identifier of the first musical artist and wherein the affinity set does not include the first musical artist.

19. The system of claim 1 wherein the one or more members of the affinity set are ranked.

20. The system of claim 1 wherein the selected advertisement is bundled advertisements.

21. The system of claim 1 wherein the seed information includes one or more songs played at the electronic device prior to the playing of the current song.

22. The system recited in claim 1, wherein the request to display the advertisement is determined by scanning a website for seed information.

23. The system recited in claim 1, wherein the affinity set is defined manually.

24. The system recited in claim 1, wherein the memory is further configured to provide the processor with instructions which when executed cause the processor to:
further determine the plurality of candidate advertisements by context in which the advertisement will be displayed.

25. The system recited in claim 1, wherein the memory is further configured to provide the processor with instructions which when executed cause the processor to:
further determine the plurality of candidate advertisements by cookies at the electronic device.

26. The system recited in claim 1, wherein the memory is further configured to provide the processor with instructions which when executed cause the processor to:
further determine the plurality of candidate advertisements by cost of displaying the advertisement and potential revenue generated by displaying the advertisement.

27. The system recited in claim 1, wherein the memory is further configured to provide the processor with instructions which when executed cause the processor to:
further determine the plurality of candidate advertisements by historical performance data.

28. The system recited in claim 1, wherein the seed information includes a channel currently playing at the electronic device.

29. The system recited in claim 1, wherein the selected advertisement includes a limited time download.

30. A method for selecting an advertisement, comprising:
receiving a request to display an advertisement on a graphical user interface of an electronic device, wherein the request includes seed information including a song associated with a first musical artist being currently being played at the electronic device;
in response to receiving the request including the seed information, determining a plurality of candidate advertisements at least on part by:
determining, using a processor and the received seed information, an affinity set comprising one or more member items determined to have an affinity with the seed information, wherein the affinity is based on at least one shared common property from at least two sources between the seed information and a member item; and
in response to determining that a member item of the determined affinity set is targeted by one or more available advertisements, including the one or more available advertisements targeting the member item in the plurality of candidate advertisements, wherein the one or more candidate advertisements promote a second musical artist; and
cause an advertisement selected from the plurality of candidate advertisements at a time contemporaneous to the playing of the current song to be displayed on the graphical user interface of the electronic device, wherein the advertisement includes an interactive element for initiating playback of a song of the second musical artist and stopping playback of the song with the first musical artist currently being played.

31. The method of claim 30 wherein the advertisement caused to be displayed is selected at least in part by selecting a publisher from a plurality of publishers.

32. A computer program product for selecting an advertisement, the computer program product embodied in a non-transitory computer readable storage medium and comprising computer instructions for:
receiving a request to display an advertisement on a graphical user interface of an electronic device, wherein the request includes seed information including a song associated with a first musical artist being currently being played at the electronic device;
in response to receiving the request including the seed information, determining a plurality of candidate advertisements at least on part by:
determining using the received seed information an affinity set comprising one or more member items determined to have an affinity with the seed information, wherein the affinity is based on at least one shared common property from at least two sources between the seed information and a member item;
in response to determining that a member item of the determined affinity set is targeted by one or more available advertisements, including the one or more available advertisements targeting the member item in the plurality of candidate advertisements, wherein the one or more candidate advertisements promote a second musical artist; and
cause an advertisement selected from the plurality of candidate advertisements at a time contemporaneous to the playing of the current song to be displayed on the graphical user interface of the electronic device, wherein the advertisement includes an interactive element for initiating playback of a song of the second musical artist and stopping playback of the song with the first musical artist currently being played.

33. A system for selecting an advertisement the system being communicatively coupled to one or more electronic devices through a network, the system comprising:
   a storage device including a database that maintains a plurality of affinities between various subsets of musical artists, musical contents, and musical genres and a plurality of advertisements from a plurality of sources and based on at least one shared common property between the various subset and the plurality of advertisements from at least two sources;
   a processor; and
   a memory coupled with the processor, wherein the memory is configured to provide the processor with instructions which when executed cause the processor to:
   receive a request to display an advertisement on a graphical user interface of an electronic device, wherein the request includes seed information including a song associated with a first musical artist being currently being played at the electronic device;
   in response to receiving the request including the seed information, determining a plurality of candidate advertisements at least on part by:
      determining, using the received seed information, an affinity set comprising one or more member items determined to have an affinity with the seed information; and
   in response to determining that a member item of the determined affinity set is targeted by one or more available advertisements, including the one or more available advertisements targeting the member item in the plurality of candidate advertisements, wherein the one or more candidate advertisements promote a second musical artist; and
   cause an advertisement selected from the plurality of candidate advertisements at a time contemporaneous to the playing of the current song to be displayed on the graphical user interface of the electronic device, wherein the advertisement includes an interactive element for initiating playback of a song of the second musical artist and stopping playback of the song with the first musical artist currently being played.

* * * * *